United States Patent Office 3,089,941
Patented May 14, 1963

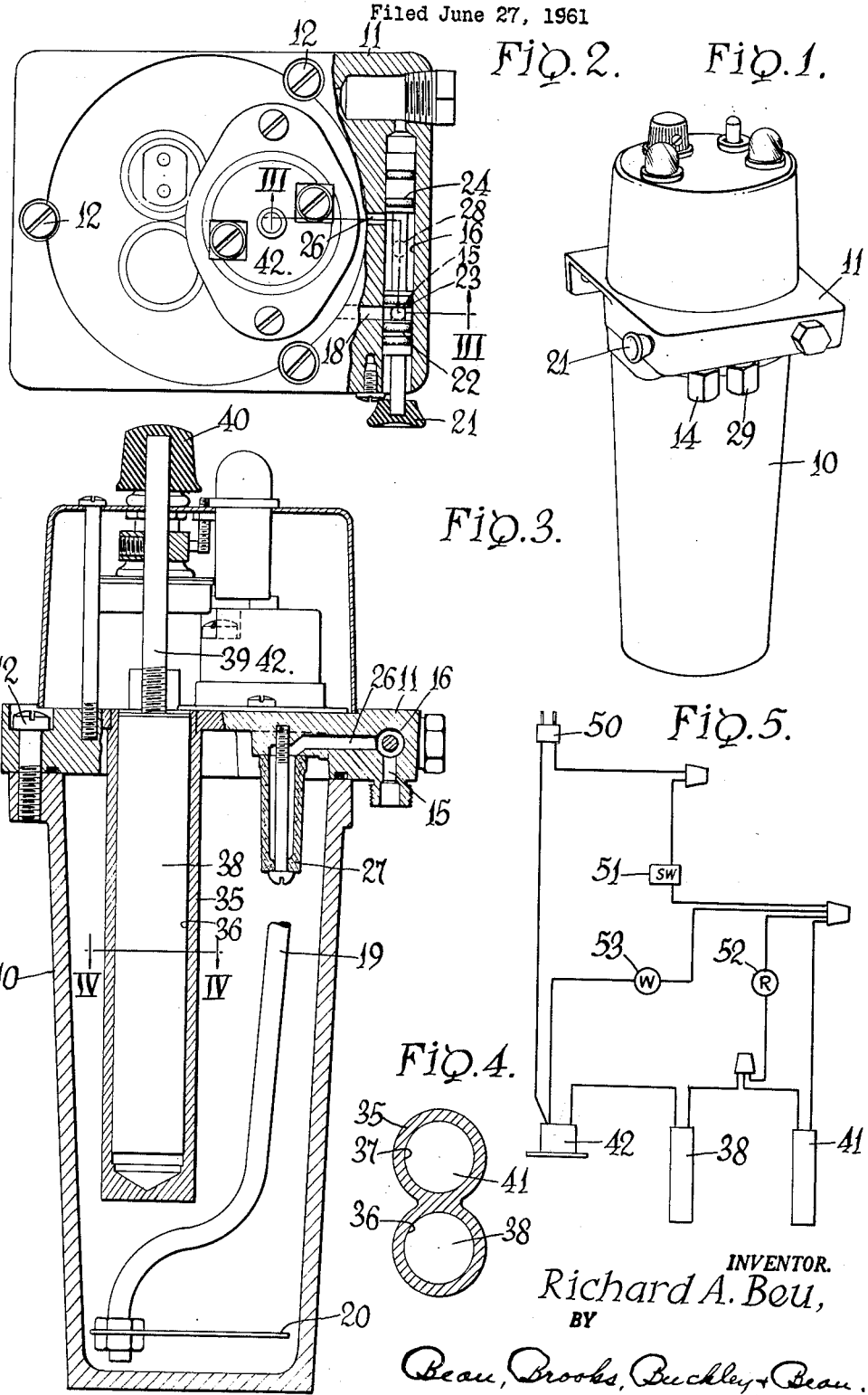

3,089,941
WATER HEATER
Richard A. Beu, Eggertsville, N.Y., assignor to Hanau
Engineering Co., Inc., Buffalo, N.Y.
Filed June 27, 1961, Ser. No. 120,087
1 Claim. (Cl. 219—38)

This invention relates to water heaters and particularly to water heaters for use in the practice of dentistry wherein relatively small quantities of water heated to moderate but relatively accurately regulated temperatures are required.

In dental practice moderately warm water for use in spray or jet form for washing debris from areas being worked upon in a patient's mouth and for other oral spray purposes is a necessity and it is essential for such purposes that the water be warmed to temperatures which may be held within a narrow range and which may nevertheless be readily adjusted by the dentist or other operative. It is further desirable that the required supply of warm water be rendered available within a short time after the device is turned on.

In the dental water heater of the present invention the supply of water in the reservoir which constitutes the body of the apparatus is heated by conduction of heat from a metal member of substantial mass which is immersed more or less centrally in the reservoir whereby the heat of the water closely corresponds to the heat of the conducting mass. Further, the thermostatic element which controls the supply of heat to the conducting member is contained within the conducting member so that it very directly reflects the degree of heat of such member.

General design considerations in the case of an electrical resistance heating arrangement of the relatively small compact type contemplated herein require the employment of a fixed resistance heating element energized by a relatively constant current supply and accordingly the thermostatic control merely switches the heating current on or off without variability. Furthermore, in electric resistance water heaters of this general type the usual arrangement is to immerse the thermostatic heat-sensitive element in the liquid to be heated.

The end result of this arrangement of the prior art is an arrangement wherein the water temperature either overshoots the temperature setting of the thermostat because of residual heat in the heating element at the moment of deenergization thereof, as well as the residual heat of the metal usually associated with the heating element for supporting the same and for similar purposes, or, in another variation, does not maintain the water at the temperature of the thermostatic setting.

In the first of the above cases, wherein the thermostat is set at the desired water temperature, the residual heat of the element and surrounding or contacting metal at the cut-off point causes the aforementioned overshooting. In the second case, wherein the thermostat is set below the desired water temperature to avoid overshooting the desired temperature, the residual heat brings the water to desired temperature momentarily but the same quickly falls below that temperature to the temperature setting of the thermostat.

In the arrangement of the present invention, because of the proximity of the thermostat to the heating element so that the former directly reflects the temperaure of the metal which conducts the heat from the element to the water, the current cuts off at a point which does not permit the heating element to rise above the actual desired water temperature. After the intitial cut-off and the transfer of a slight amount of residual heat from the element to the water, the heating element is again energized to add more heat and successive brief energizations of the heating element keep the water temperature within a very narrow range of the desired temperature.

In the form of the invention illustrated and described herein by way of example a bypass valve is provided which permits the user to avail himself of either warm or cold water, as required and by simple manipulation of a push-button valve. In addition to the selectively variable control thermostat referred to above, the apparatus of the present invention is provided with a safety thermostat set to operate at a somewhat higher temperature than the regulating thermostat to avoid injury to a patient if the regulating thermostat should fail to operate.

Convenient tell-tale lights apprise the operative of the condition of operation of the apparatus at all times, as will appear later herein.

In addition to the foregoing improvements in the control of water temperature in the heater of the present invention, the arrangement is such that all of the operating parts, particularly including the heating and thermostatic elements, are carried by a removable cover element for the receptacle or reservoir. Furthermore, the seal of the cover member with respect to the receptacle proper is the only watertight seal required, with the exception of the actual water inlet and outlet connections. Both the heating element and the control thermostat may readily be removed and replaced externally without removing the cover member from the receptacle proper, thus greatly facilitating maintenance of the apparatus.

Other improvements inherent in the water heater of the present invention consist in simple and rugged construction, ease and facility of assembly and disassembly, and safe and foolproof operation. Further advantages residing in the construction and use of the water heater of the present invention will become apparent to those skilled in the present art from a study of the accompanying drawing and the following detailed specification which discloses an embodiment of the principles of the present invention. However, it is to be understood that such embodiment is by way of example only and that the scope of the invention is not limited to such exemplary embodiment nor otherwise than as defined in the appended claims.

In the drawings:

FIG. 1 is a general perspective view of one form of the water heater of the present invention;

FIG. 2 is a top plan view of the structure of FIG. 1 with the cover member removed and with a portion thereof broken away for added illustration;

FIG. 3 is a vertical cross sectional view through the apparatus of FIGS. 1 and 2;

FIG. 4 is a fragmentary cross sectional view taken approximately on the line IV—IV of FIG. 3; and FIG. 5 is a schematic diagram showing the electrical connections between the several components of the heater and control system.

Like characters of reference denote like parts throughout the several figures of the drawing and, referring particularly to FIGS. 1 and 3, the numeral 10 designates a tapered cylindrical receptacle member, preferable of metal, which constitutes the main body member of the apparatus. A cap plate 11 is removably attached to the upper open end of receptacle member 10 by screws 12 and cap plate 11 constitutes the main support for the major portion of the operating instrumentalities of the device.

Water from a city water supply or the like is admitted to the receptacle 10 by virtue of a connection 14 which leads to an upwardly extending passage 15 which in turn communicates with a horizontal bore 16 in the cap plate 11. In alignment with the upward passage 15 and extending from the horizontal bore 16 is a further inlet passage 18 which leads to a downwardly extending tubular member 19, the latter being attached to the underside of cap plate 11.

Tubular member 19 is offset as shown in FIG. 3 and has attached to its lower end a baffle plate 20, the tubular member discharging into receptacle member 10 below the baffle plate. Thus turbulence is minimized and, since the incoming water flows upwardly about the edges of baffle plate 20, any tendency of the rising, warming water to channel along the wall of the heater containing conducting element is minimized.

It will be noted that water flowing into the bore 16 from passage 15 will, with the parts in the position illustrated in FIG. 2, flow into the receptacle through the further inlet passage 18 and tubular member 19. A manual bypass valve is designated 21 and includes enlargements 22 and 23 lying at opposite sides of the passages 15 and 18 whereby water entering at 15 can flow only into the passage 18. Valve 21 is provided with a further enlargement 24 which, when the valve 21 is in the position illustrated in FIG. 2, cooperates with enlargement 23 to establish a discharge flow passage from the receptacle.

The discharge passage means comprises a passage 26 which leads from the interior of a filter element 27 to the bore 16, and outlet passage 28 which extends downwardly through the plate 11 where it is provided with an outlet fitting 29, visible in FIG. 1.

When it is wished to have the water supply bypass the heating element the valve hanle 21 is pulled outwardly to its bypass position wherein the enlargement 24 blocks off the passage 26 from communication with the bore 16 and the inlet bore 15 is in direct communication with the outlet bore 28 by way of bore 16.

The metallic heat conducting mass which contains the electrically energized heating element and the regulating thermostatic element comprises a vertical tubular member 35 which contains two separate vertically extending bores 36 and 37 as shown in FIG. 4. The bores 36 and 37 are closed at their lower ends and open at their upper ends to the space above cap plate 11, the tubular member 35 being fitted into the cap plate 11 and secured thereto in any desired water-tight manner as by brazing or the like.

A cartridge type thermostatic element of well known and commercially available type is designated 38 in FIG. 3 and is conventionally provided with a rod 39 terminating in a manipulating knob 40 for regulating the temperature setting of the thermostatic cartridge element 38. The thermostatic cartridge 38 is inserted in bore 36 of tubular member 35 and a cartridge type of electrical resistance heating element 41, likewise of known commercial design, is inserted in the other bore 37 of tubular member 35.

An overload or limiting thermostat is provided for reasons of safety in addition to the regulatable cartridge thermostat 38 and such safety thermostat, likewise of commercially available construction, is designated 42 in FIGS. 2 and 3. The manner in which the several electrical components are interconnected is illustrated schematically in the diagrammatic view, FIG. 5, to which reference will now be had.

The heating element 41 and the thermostats 38 and 42 are all connected in series to a wall plug 50 and a manual control switch 51 is likewise in this series circuit.

A tell-tale lamp which may be red for easy identification is indicated at 52 and is connected in shunt with respect to the heating element 41 so that it is energized whenever current is flowing through the heating element. A second tell-tale lamp which may be white for ready identification is designated 53 and is connected in shunt with respect to both thermostats 38 and 42 and the heating element 41. The tell-tale lamp 53 is illuminated at all times when the plug 50 is connected with a source of current and manual switch 51 is closed. That is, tell-tale lamp 53 merely indicates that the device is in service, whether or not the heating element is actually in operation, whereas the tell-tale lamp 52 indicates that the heating element itself is actually energized.

What is claimed is:

A water heater assembly for dental use comprising,
a container having an open top,
a cover assembly secured to and closing the open top of said container,
said cover assembly being in the form of a plate-like cap having a portion thereof overhanging and projecting from said container,
an inlet and an outlet nipple rigid with said overhanging portion of the cap and said cap having passages therein leading from such nipples to the undersurface of the cap overlying the open top of said container,
said passages having transversely aligned portions, said overhanging portion of the cap having a transverse valve bore therein intersecting said aligned portions of the passages, and a valve member slidably received in said valve bore for selectively bypassing those portions of the passages beyond said valve bore,
a heat conducting mass depending from said cap within the confines of said container,
said mass having a pair of adjacent vertical bores therein extending from near the lower end of said mass up to and opening at the upper end thereof,
a thermostat cartridge fitted within one of said bores and an electrical heating element fitted within the other of said bores, with said thermostat and said heating element being connected in series.

References Cited in the file of this patent

UNITED STATES PATENTS

| | | |
|---|---|---|
| 1,844,268 | Alex | Feb. 9, 1932 |
| 1,984,076 | Monnot | Dec. 11, 1934 |
| 2,432,169 | Morgan et al. | Dec. 9, 1947 |
| 2,576,558 | Bede | Nov. 27, 1951 |
| 2,673,919 | Arvins et al. | Mar. 30, 1954 |
| 2,770,698 | Ulanet | Nov. 13, 1956 |

FOREIGN PATENTS

| | | |
|---|---|---|
| 590,131 | Germany | Dec. 23, 1933 |